(12) United States Patent
Ashworth

(10) Patent No.: US 6,363,869 B1
(45) Date of Patent: Apr. 2, 2002

(54) POTASSIUM HYDROXIDE FLUE GAS INJECTION TECHNIQUE TO REDUCE ACID GAS EMISSIONS AND IMPROVE ELECTROSTATIC PRECIPITATOR PERFORMANCE

(75) Inventor: Robert Ashworth, Wooster, OH (US)

(73) Assignees: ClearStack Combustion Corporation; Robert A. Ashworth, both of Wooster, OH (US)

( * ) Notice: Subject to any disclaimer, the term of this patent is extended or adjusted under 35 U.S.C. 154(b) by 0 days.

(21) Appl. No.: 09/590,404

(22) Filed: Jun. 8, 2000

Related U.S. Application Data

(63) Continuation-in-part of application No. 09/243,501, filed on Feb. 3, 1999, now Pat. No. 6,085,674.
(60) Provisional application No. 60/140,174, filed on Jun. 21, 1999.

(51) Int. Cl.[7] .............................. F23J 11/00; F23J 15/00; F23B 7/00
(52) U.S. Cl. ....................... 110/345; 110/342; 110/348; 110/215
(58) Field of Search ................................. 110/203, 216, 110/215, 342, 341, 344, 345, 346, 348

(56) References Cited

U.S. PATENT DOCUMENTS

| 2,925,069 A | | 2/1960 | Terpe | |
|---|---|---|---|---|
| 3,727,562 A | | 4/1973 | Bauer | |
| 3,859,416 A | * | 1/1975 | Urban | 423/242 |
| 3,864,450 A | * | 2/1975 | Takeyama et al. | 423/239 |
| 3,904,743 A | * | 9/1975 | Urban | 423/567 |
| 3,955,512 A | | 5/1976 | Martin et al. | |
| 4,201,753 A | * | 5/1980 | Dayen | 423/242 |
| 4,218,427 A | * | 8/1980 | Yan | 423/239 |
| 4,343,606 A | | 8/1982 | Blair et al. | |
| 4,423,702 A | | 1/1984 | Ashworth et al. | |
| 4,427,362 A | | 1/1984 | Dykema | |
| 4,685,404 A | | 8/1987 | Sheppard et al. | |
| 4,765,258 A | | 8/1988 | Zauderer | |
| 4,985,218 A | * | 1/1991 | DeVita | 423/235 |
| 5,288,309 A | * | 2/1994 | Wright | 96/22 |
| 5,458,659 A | | 10/1995 | Ashworth | |
| 5,746,141 A | * | 5/1998 | Lacquaniti | 110/203 |
| 5,785,936 A | * | 7/1998 | Levendis | 423/210 |
| 6,063,352 A | * | 5/2000 | Risse et al. | 423/243.06 |
| 6,139,807 A | * | 10/2000 | Risse et al. | 422/171 |

* cited by examiner

Primary Examiner—Ira S. Lazarus
Assistant Examiner—K. B. Rinehart
(74) Attorney, Agent, or Firm—Buchanan Ingersoll, P.C.

(57) ABSTRACT

A method for reducing acid gas emissions from a carbonaceous fuel burning power plant. An aqueous potassium hydroxide dry scrubber method is used to reduce the formation of nitrogen oxides, sulfur oxides, hydrogen chlorides and hydrogen fluoride from plant flue gases. For those plants utilizing an electrostatic precipitator to remove particulate matter from the flue gas, the performance of this component is also enhanced by the injection of potassium hydroxide upstream of the component. As an added advantage, the final product has beneficial commercial utility as a fertilizer product, rather than having to be disposed in a landfill.

26 Claims, 2 Drawing Sheets ized by the U.S. EPA to reduce acid gases, nitrogen
POTASSIUM HYDROXIDE FLUE GAS INJECTION TECHNIQUE TO REDUCE ACID GAS EMISSIONS AND IMPROVE ELECTROSTATIC PRECIPITATOR PERFORMANCE

RELATED APPLICATION

This application is a continuation in part of application Ser. No. 09/243,501 filed Feb. 3, 1999, and now U.S. Pat. No. 6,085,674; and is related to Provisional Patent Application Ser. No. 60/140,174 filed Jun. 21, 1999.

BACKGROUND OF THE INVENTION

1. Field of the Invention

This invention relates to an aqueous potassium hydroxide dry scrubber method that provides for reduction of acid gases, nitrogen oxides, sulfur oxides, hydrogen chloride and hydrogen fluoride from carbonaceous fuel combustion flue gases. In addition, if an electrostatic precipitator (ESP) is used to remove particulate from the combustion flue gases, its performance will also improve.

2. Description of the Prior Art

U.S. Pat. Nos. 4,246,245; 5,814,288 describe the use of calcium/magnesium hydroxide/oxides in a dry scrubber mode wherein the flue gas is brought near to its dew point to enhance the alkali-sulfur dioxide reactions. The alkalis, either in slurry or dry form are introduced into the flue gas upstream of normally a baghouse to capture the sulfur dioxide as alkali sulfites/sulfates that are collected on the bags and removed from the flue gas stream. While these methods accomplish their intended purposes, they provide only $SO_2$ removal from the flue gas; however, sulfur trioxide ($SO_3$), a fly ash conditioning agent, is also removed. With these technologies, if a downstream ESP is used to collect particulate, the efficiency suffers due to increased fly ash resistivity.

Sodium based compounds have also been used in a dry scrubber mode (e.g. U.S. Pat. Nos. 4,960,445 and 5,002,741). These alkalis are also introduced into the flue gas upstream of an ESP or baghouse. They have proved effective for reducing both sulfur and nitrogen oxide emissions. In addition, ESP performance is improved. Whereas the sodium based compounds are effective in reducing sulfur and nitrogen oxide emissions and improving ESP performance, they have no commercial value. Further, sodium based compounds are not desirable in landfills for they are soluble and can enter underground aquifers to increase water salinity. Although sodium sorbents are very effective at reducing air pollutants, the potential ground water pollution with the use of these sorbents can offset their air pollutant reduction benefits.

There are many types of devices to reduce sulfur dioxide emissions to the levels prescribed by the U.S. EPA, but the same cannot be said about nitrogen oxides. In the Year 2003, the U.S. EPA will regulate nitrogen oxides emissions for all types of coal-fired boilers to 0.15 lb $NO_x/10^6$ Btu in the Eastern and Midwestern States during the ozone season (May through September).

Most commercial $NO_x$ reduction technologies cannot meet this limit. Although technologies are in the developmental stage, the only technology available today that will guarantee such a low level of $NO_x$ emissions is the Selective Catalytic Reduction (SCR) technology. The SCR method uses ammonia addition and a downstream catalyst placed in the flue gas stream to destroy the $NO_x$ produced in the coal combustion process. This approach is expensive both from capital and operating cost perspectives. Further, arsenic in the coal (<10 ppmw) can poison the catalyst, shortening its life. Still further, ammonium sulfites/sulfates and calcium sulfates from the combustion process can blind the catalyst, reducing its effectiveness. The U. S. EPA also regulates particulate matter at sizes less than 2.5 microns ($PM_{2.5}$). SCR technology requires ammonia addition and there is always some ammonia slip present to react with sulfur dioxide ($SO_2$) and nitrogen dioxide ($NO_2$) to increase fine particulate [$(NH_4)_2SO_4$ and $NH_4NO_3$] concentrations in the atmosphere ($PM_{2.5}$).

The method of the present invention provides the benefits seen with the use of sodium sorbents but rather than creating landfill ground pollution problems, provides a potassium sulfate/nitrate/fly ash mix that has considerable fertilizer value (the $K_2SO_4/KNO_3$ value estimated at $150/ton by agricultural engineers). The potassium hydroxide spray-dry scrubbing technique can be used as a $NO_x$ trim in combination with low $NO_x$ burners and Reburning technology to bring coal-fired power plants into $NO_x$ emission compliance, thus providing an option to the SCR technology.

It is also the low cost method, when used in combination with a baghouse to bring small-scale coal-fired stokers (stokers up to 50 million Btu/hr) into $SO_2$, $NO_x$ and particulate compliance without the need for any additional $SO_2/NO_x$ control techniques. Today, small-scale coal-fired stokers are facing elimination due to the more stringent state environmental regulations. The only solution currently available today is to replace coal-fired stokers with relatively expensive fluidized bed coal combustion systems wherein sulfur dioxide and nitrogen oxides may be controlled and baghouses are included for particulate control. Thus, many small-scale stoker users are switching to lower capital cost natural gas fired boilers/hot water heaters. Although low in capital cost, the switch to natural gas drives production/manufacturing costs up due to the higher price of natural gas compared to coal that increases annual operating costs. What is needed for these coal-fired stokers is a low capital and operating cost retrofit technology that reduces nitrogen and sulfur oxides and particulate from small coal fired stoker units and that is what the potassium hydroxide dry scrubber provides.

SUMMARY OF THE INVENTION

I have discovered a process using an aqueous solution of potassium hydroxide to reduce acid gases; nitrogen oxides, sulfur oxides, hydrogen chloride and hydrogen fluoride from carbonaceous fuel combustion flue gas. In addition, if an electrostatic precipitator (PSP) is used to remove particulate from the combustion flue gases, its performance will also improve. The application of the technology preferably comprises adding a co-current flue gas-spray tower upstream of an ESP or baghouse. Aqueous potassium hydroxide (KOH) is spray dried into the flue gas upstream of the particulate control device. The KOH reacts with $SO_2$ and $SO_3$ to form $K_2SO_4$, NO and $NO_2$ to form $KNO_3$, HCL to form KCl and HF to form KF. These salts are captured as particulate and removed with the carbonaceous-fuel fly ash from an ESP or baghouse.

BRIEF DESCRIPTION OF THE DRAWINGS

Various other objects, features and advantage of the invention will become more apparent by reading the following detailed description in conjunction with the drawings, which are shown by example only, wherein.

DETAILED DESCRIPTION OF THE INVENTION

I have discovered a process that can be used to remove sulfur oxides and nitrogen oxides from carbonaceous fuel combustion flue gas by spray drying potassium hydroxide into the gas, the potassium hydroxide reacting with the sulfur and nitrogen oxides to form potassium sulfates/sulfites and nitrates/nitrites. Further, the presence of these potassium salts on electrostatic precipitator (ESP) rods and plates facilitates added current flow to the passing flue gas thus increasing the "spark over" voltage from the rods to the plates. The increased voltage improves the ESP performance.

NaTec Resources Inc. (U.S. Pat. No. 5,002,741) uses a naturally occurring sodium bicarbonate (Nahcolite) that is injected as a particulate into the carbonaceous fuel combustion flue gas, upstream of an ESP or baghouse. The technique was applied to a 575 MWe lignite-fired Texas electric utility boiler and showed a 70% sulfur oxides ($SO_2$ and $SO_3$) emissions reduction with a simultaneous 40% reduction in nitrogen oxide ($NO_x$) emissions. Further, even though $SO_3$, a fly ash conditioner, is removed the sodium salts increase the "spark over" voltage to increase ESP performance.

It was also shown that the smaller the Nahcolite particle size, the higher the acid gas removal and sorbent utilization efficiencies. With a particle size of 9 micron, about 100% of the $SO_2$ was removed with a normalized stoichiometric ratio (NSR) of 1.0. With a particle size of about 44 microns, $SO_2$ removal dropped to a range of 65 to 70% with an NSR of 1.0.

Nahcolite has been shown to work well in a dry scrubber to remove sulfur and nitrogen oxides from coal combustion flue gases and to also improve ESP performance. However, the sodium sulfate and nitrate produced have no immediate commercial use and sodium is not an element that is desired to be in a solid waste disposal stream. The sodium salts produced from the flue gas dry scrubber are highly soluble and have to be placed in expensive clay-lined landfills to prohibit potential contamination of underground aquifers.

Potassium sulfate and potassium nitrate, although similar chemically to the corresponding sodium salts, are desirable salts that have a market potential in the fertilizer industry. Although kinetic rates are not readily available to compare sodium and potassium compound reactions with $SO_2$ and NO; the equilibrium coefficients of sodium bicarbonate $NaHCO_3$ and KOH reactions with $SO_2$ and NO were calculated using the Janaf Thermochemical Tables for the flue gas temperature range of interest:

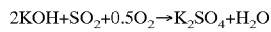
$2KOH+SO_2+0.5O_2 \rightarrow K_2SO_4+H_2O$

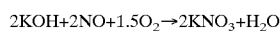
$2KOH+2NO+1.5O_2 \rightarrow 2KNO_3+H_2O$ and

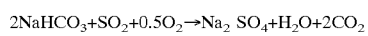
$2NaHCO_3+SO_2+0.5O_2 \rightarrow Na_2SO_4+H_2O+2CO_2$

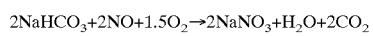
$2NaHCO_3+2NO+1.5O_2 \rightarrow 2NaNO_3+H_2O+2CO_2$

Figure 1:
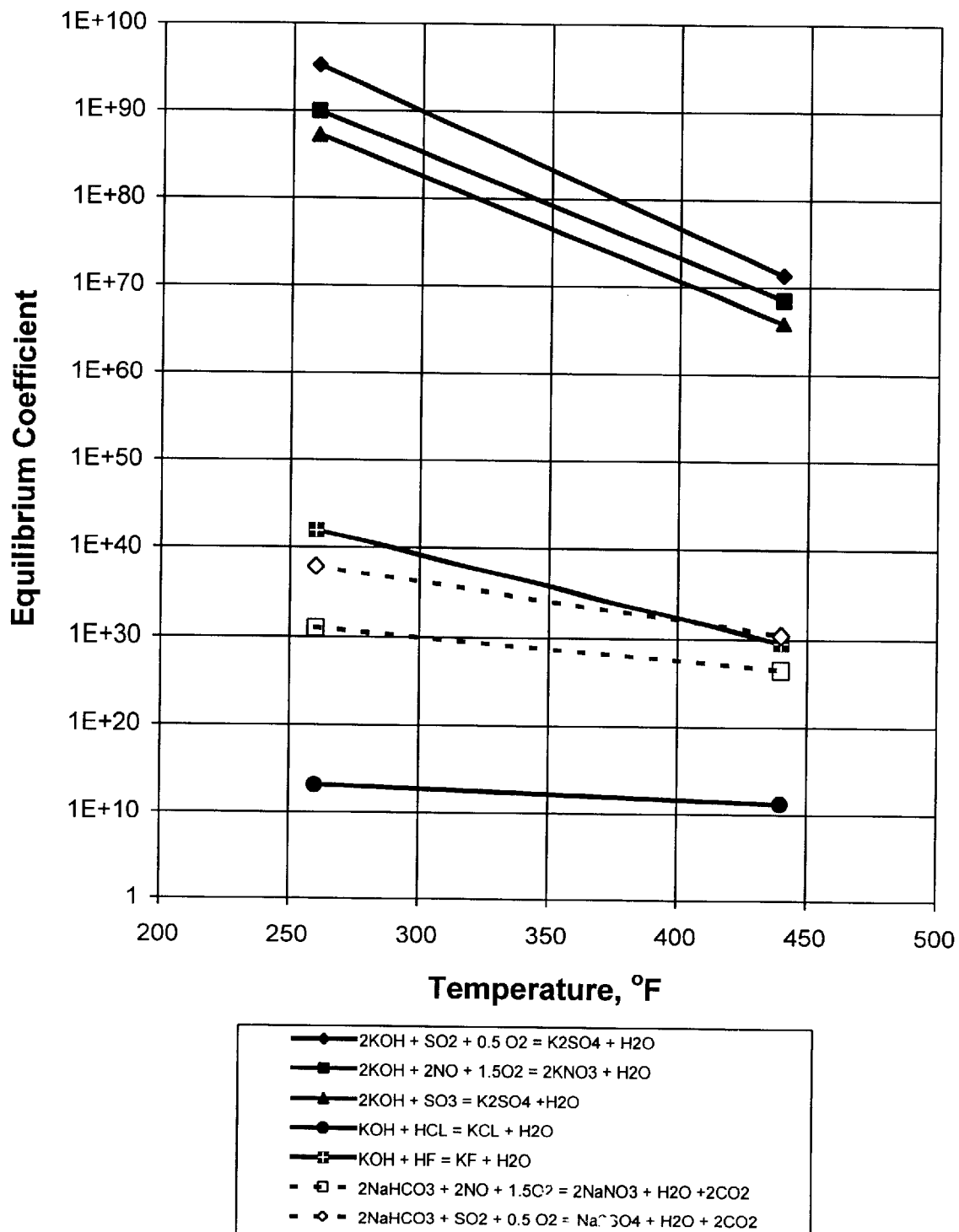
FIG. 1 shows reaction equilibria for KOH and $NaHCO_3$ reactions with $SO_2$ and NO, and KOH with HCL and HF.

The compared equilibrium coefficients for these reactions are shown in FIG. 1. As shown, the equilibrium coefficients for the KOH reactions are much higher than that for $NaHCO_3$. Therefore, one could expect that KOH would be more effective than $NaHCO_3$ in removing sulfur and nitrogen oxides from flue gases. In addition, the following reaction equilibria were calculated for potassium hydroxide reactions with other flue gas acid components:

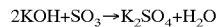
$2KOH+SO_3 \rightarrow K_2SO_4+H_2O$

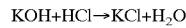
$KOH+HCl \rightarrow KCl+H_2O$

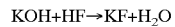
$KOH+HF \rightarrow KF+H_2O$

As seen in FIG. 1, the sulfur trioxide reaction with KOH is more favored than the halogen gases (HCl and HF), but all three of these acid gases will be removed to a degree. $SO_3$ can cause a bluish white opacity problem with flue gas concentrations of 25 ppmv and greater. $SO_3$ opacity is often seen with oil-fired power plants which operate at high combustion temperatures and have vanadium pentoxide in the fly ash that promotes $SO_3$ formation.

It is also well known that the smaller the particle size of a sorbent, the larger its surface area per unit weight, and the higher its reactivity. Therefore, KOH injected as a solution (particles at the molecular level) will have an infinite surface area for reaction and 100% KOH utilization will be quickly achieved in the spray-dry scrubber.

The potassium hydroxide-water solution used for the spray-dry scrubber can be of any pumpable concentration from less than 1% up to nominally 50% by weight. The rate of potassium hydroxide addition into the flue gas is determined for each application, depending on flue gas rate and flue gas concentrations of $SO_2$, $SO_3$, NO, HCL and HF. The rate of KOH is set for a specific application, depending on the reduction of acid gases desired. The rate of KOH for any application will be set to yield the desired (accounting for molar concentrations of all acid gases) stoichiometric ratio (NSR). With an NSR of one, there would be exactly enough KOH to react with all of the acid gases. If the technique is used for $SO_3$ opacity control only, the rate will be set to reduce $SO_3$ (other acid gases will also be reduced) down to a level where the flue gas loses its bluish white haze, normally there is no haze at levels of 10 to 20 ppmv. If the KOH is used to improve ESP performance only, the rate will be set to create a concentration of KOH reactant, injected into the flue gas, that creates the desired ESP performance.

Figure 2:
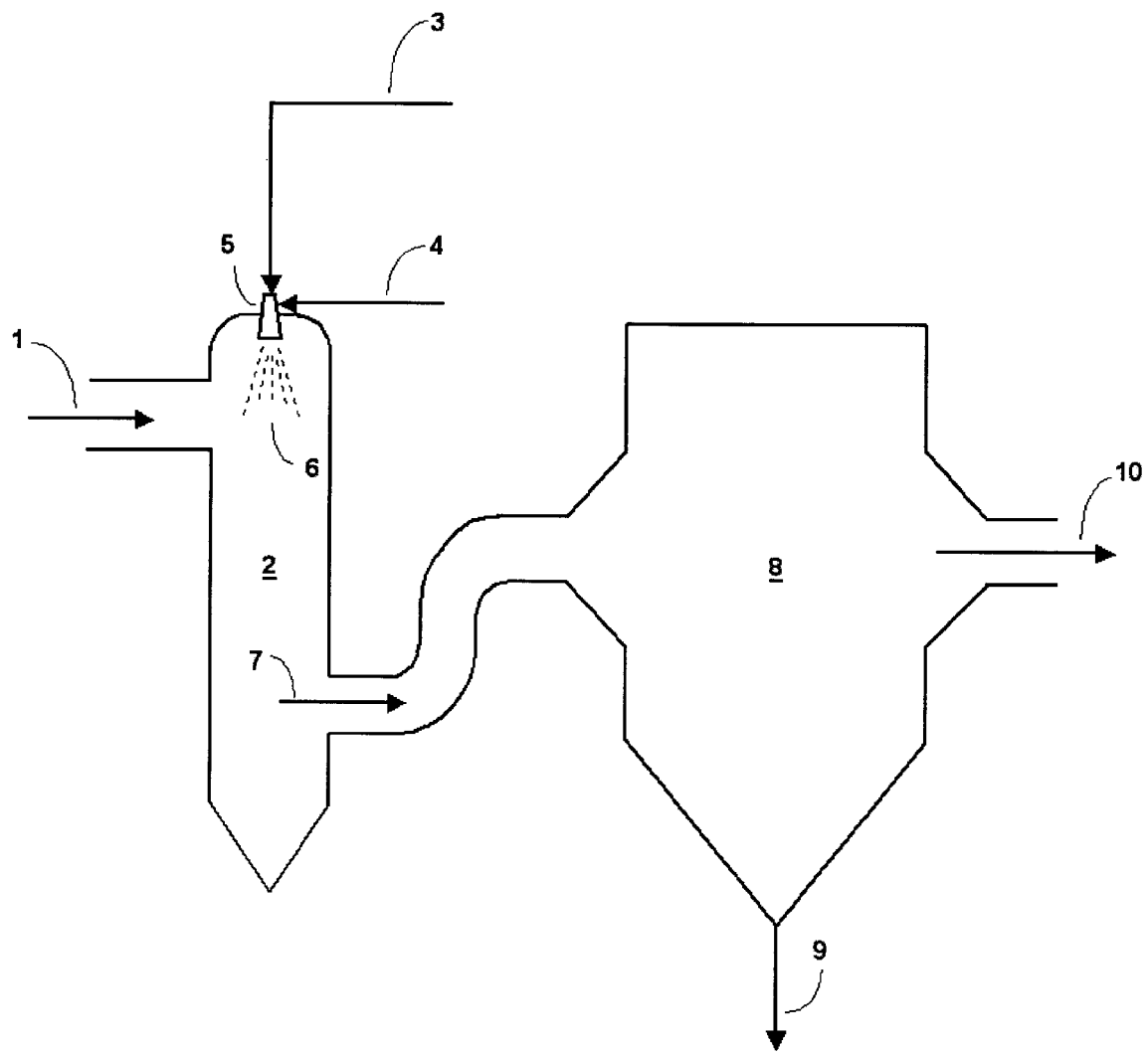
FIG. 2 is a pictorial description of the potassium hydroxide spray-dry scrubbing system.

A typical example of the process of the present invention is shown schematically in FIG. 2. It will be understood by those skilled in the art that certain variations from this schematic could be made with such variations still being within the context of the present invention. In the embodiment shown in FIG. 2, a spray-dry tower 2 is added upstream of the flue gas particulate control device 8. The flue gas temperature upstream of particulate control devices on carbonaceous-fuel fired boilers is normally in the range of 250 to 500° F. A KOH solution (e.g. 25% KOH) is pumped to the spray-dry tower where it is atomized into the flue gas stream 1.

The spray can be injected in a counter-current or cross-flow direction relative to the flow of the flue gas; preferably, it is injected in a co-current direction as shown in FIG. 2. Either a mechanical or dual fluid nozzle 5 can be used to atomize the KOH solution. Air, steam or inert gases may be used as the atomizing fluid. As the KOH solution comes into intimate contact with the hot flue gas, the water component of the atomized solution evaporates and the KOH, at the molecular level, reacts with the acid gas components in the flue gas stream. The produced potassium salts, in suspension, leave the tower 7 to enter into the particulate control device. The particulate control device 8 can be an electrostatic precipitator, a baghouse, or other type of particulate control device. Particulate, including the potassium salts, are removed from the gas stream in a dry form 9. The flue gas exits 10 the particulate control device and enters the atmosphere though a stack.

The fly ash mixed with the potassium salts may be sold as a fertilizer. Alternatively, if a wet electrostatic precipitator is used, the soluble potassium salts may be separated (salts are in solution) from the fly ash and then be precipitated in an applicable crystallizer, filtered and dried to make a more concentrated $K_2SO_4/KNO_3$ fertilizer product.

While specific embodiments of practicing the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the following claims, and any and all embodiments thereof.

What is claimed is:

1. A method for reducing nitrogen oxides ($NO_x$) and/or sulfur oxides ($SO_2$ and $SO_3$) emissions from carbonaceous fuel combustion flue gases, said method comprising the steps of:
    a) introducing an aqueous potassium hydroxide solution into a flue gas contacting device upstream of a particulate control device wherein the said solution is atomized into the flue gas;
    b) providing a residence time in the flue gas contacting device that is sufficient to provide for said solution water evaporation and for reaction of said potassium hydroxide with acid gases contained in said flue gas to form potassium salts;
    c) removing said particulate that includes said potassium salts co-mingled with carbonaceous fuel fly ash from the flue gas by a particulate control device; and
    d) wherein a potassium hydroxide spray is injected into the flue gas stream to reduce sulfur trioxide in the flue gas to a level of 25 ppmv or less.

2. The method according to claim 1 wherein the aqueous potassium hydroxide solution contains from less than one weight percent potassium hydroxide to nominally fifty weight percent potassium hydroxide.

3. The method according to claim 1 wherein said potassium hydroxide solution is sprayed into said carbonaceous flue gas stream in a co-current, cross-flow or counter-current direction relative to the direction of said flue gas stream.

4. The method according to claim 1 wherein the aqueous potassium hydroxide solution is atomized with a mechanical or dual fluid nozzle.

5. The method according to claim 4 wherein the atomizing fluid for the dual fluid nozzle comprises one or more of the class consisting of air, steam, nitrogen or inert gas generator gas.

6. The method according to claim 1 wherein the particulate control device comprises one or more of the class consisting of dry electrostatic precipitators, wet electrostatic precipitators, baghouses, wet scrubbers or other high efficiency particulate removal devices.

7. The method according to claim 1 wherein the said fly ash and said potassium salts comprising primarily potassium nitrate and potassium sulfate are collected in a dry state as a co-mingled product for use as a fertilizer or a fertilizer component.

8. The method as in claim 1 wherein a potassium hydroxide spray is injected into a flue gas stream to improve electrostatic precipitator performance by increasing the precipitator spark over voltage to improve electrostatic precipitator performance, the rate of potassium hydroxide added being such to provide the degree of performance desired.

9. The method according to claim 1 wherein said potassium hydroxide solution is sprayed in a co-current orientation to said flue gas stream.

10. A method for reducing nitrogen oxides ($NO_x$) and/or sulfur oxides ($SO_2$ and $SO_3$) emissions from carbonaceous fuel combustion flue gases, said method comprising the steps of:
    a) introducing an aqueous potassium hydroxide solution into a flue gas contacting device upstream of a particulate control device wherein the said solution is atomized into the flue gas;
    b) providing a residence time in the flue gas contacting device that is sufficient to provide for said solution water evaporation and for reaction of said potassium hydroxide with acid gases contained in said flue gas to form potassium salts; and
    c) removing said particulate that includes said potassium salts co-mingled with carbonaceous fuel fly ash from the flue gas by a electrostatic precipitator.
    d) wherein a potassium hydroxide spray is injected into a flue gas stream to improve electrostatic precipitator performance by increasing the precipitator spark over voltage.

11. The method according to claim 10 wherein the aqueous potassium hydroxide solution contains from less than one weight percent potassium hydroxide to nominally fifty weight percent potassium hydroxide.

12. The method according to claim 10 wherein said potassium hydroxide solution is sprayed into said carbonaceous flue gas stream in a co-current, cross-flow or counter-current direction relative to the direction of said flue gas stream.

13. The method according to claim 10 wherein the potassium hydroxide solution is atomized with a mechanical or dual fluid nozzle.

14. The method according to claim 10 wherein the particulate control device comprises one or more of the class consisting of dry electrostatic precipitators, wet electrostatic precipitators, baghouses, wet scrubbers or other high efficiency particulate removal devices.

15. The method according to claim 10 wherein the said fly ash and said potassium salts comprising primarily potassium nitrate and potassium sulfate are collected in a dry state as a co-mingled product for use as a fertilizer component.

16. The method according to claim 10 wherein the said potassium salts comprising primarily potassium nitrate and potassium sulfate are collected in a solution, separated from the fly ash particulate and then are precipitated from solution, filtered and dried for use as a fertilizer component.

17. The method as in claim 10 wherein the said potassium salts comprising primarily potassium nitrate and potassium sulfate are collected in a solution, filtered and dried for use as a fertilizer component.

18. The method as in claim 10 wherein a potassium hydroxide spray is injected into a flue gas stream to reduce flue gas stack opacity created by sulfur trioxide in the flue gas, the rate of potassium hydroxide added being such to reduce the sulfur trioxide in the flue gas to a level of 25 ppmv or less.

19. A method for reducing nitrogen oxides ($NO_x$) and/or sulfur oxides ($SO_2$ and $SO_3$) emissions from carbonaceous fuel combustion flue gases, said method comprising the steps of:

a) introducing an aqueous potassium hydroxide solution into a flue gas contacting device, downstream of the boiler and upstream of a particulate control device wherein the solution is atomized into flue gas that is at a temperature range of about 250° to 500° F.;

b) providing a resident time in the flue gas contacting device that is sufficient to provide for said solution water evaporation and for reaction of said potassium hydroxide and acid gasses contained in said flue gas to form potassium salts; and c) removing said particulate that includes said potassium salts co-mingled with carbonaceous fuel fly ash from flue gas by a particulate control device.

20. The method according to claim 19 wherein said potassium hydroxide solution is sprayed into said carbonaceous flue gas stream in a co-current, cross-flow or counter-current direction relative to the direction of said flue gas stream.

21. The method according to claim 19 wherein the potassium hydroxide solution is atomized with a mechanical or dual fluid nozzle.

22. The method according to claim 19 wherein the particulate control device comprises one or more of the class consisting of dry electrostatic precipitators, wet electrostatic precipitators, baghouses, wet scrubbers or other high efficiency particulate removal devices.

23. The method according to claim 19, wherein the said fly ash and said potassium salts comprising primarily potassium nitrate and potassium sulfate are collected in a dry state as a co-mingled product for use as a fertilizer or a fertilizer component.

24. The method according to claim 19 wherein the said potassium salts comprising primarily potassium nitrate and potassium sulfate are collected in a solution, separated from the fly ash particulate and then are precipitated from solution, filtered and dried for use as a fertilizer or a fertilizer component.

25. The method as in claim 19 wherein a potassium hydroxide spray is injected into a flue gas stream to reduce flue gas stack opacity created by sulfur trioxide in the flue gas, the rate of potassium hydroxide added being such to reduce the sulfur trioxide in the flue gas to a level of 25 ppmv or less.

26. The method as in claim 19 wherein a potassium hydroxide spray is injected into a flue gas stream to improve electrostatic precipitator performance by increasing the precipitator "spark over" voltage to improve electrostatic precipitator performance.

* * * * *